(12) United States Patent
Kim et al.

(10) Patent No.: US 10,183,763 B2
(45) Date of Patent: Jan. 22, 2019

(54) DUAL-SLOPING CAROUSEL

(71) Applicants: Korea Airports Corporation, Gangseo-gu, Seoul (KR); Yeo Myung Hi-Tec, Co., Ltd., Siheung-si, Gyeonggi-do (KR)

(72) Inventors: Dong Soo Kim, Gimpo-si (KR); Pil Geun Yun, Chungcheongbuk-do (KR); Hyun Suek Kim, Gyeyang-gu Incheon (KR); Myung Hee Lee, Siheung-si (KR)

(73) Assignee: KOREA AIRPORTS CORPORATION, Gangseo-Gu, Seoul (KR)

( * ) Notice: Subject to any disclaimer, the term of this patent is extended or adjusted under 35 U.S.C. 154(b) by 0 days.

(21) Appl. No.: 15/567,442

(22) PCT Filed: Nov. 12, 2015

(86) PCT No.: PCT/KR2015/012146
§ 371 (c)(1),
(2) Date: Oct. 18, 2017

(87) PCT Pub. No.: WO2016/175410
PCT Pub. Date: Nov. 3, 2016

(65) Prior Publication Data
US 2018/0111700 A1    Apr. 26, 2018

(30) Foreign Application Priority Data

Apr. 29, 2015    (KR) .......................... 10-2015-0060589

(51) Int. Cl.
*B64F 1/32*    (2006.01)
*B65G 21/22*    (2006.01)
(Continued)

(52) U.S. Cl.
CPC ............ *B64F 1/368* (2013.01); *B64F 1/32* (2013.01); *B65G 17/068* (2013.01); *B65G 21/22* (2013.01); *B65G 35/06* (2013.01)

(58) Field of Classification Search
CPC ........................... B65G 17/068; B64F 1/368
(Continued)

(56) References Cited

U.S. PATENT DOCUMENTS 3,361,249 A * 1/1968 Cadman ............... B65G 17/066
                                                198/607
3,416,645 A * 12/1968 Jones ................... B65G 17/068
                                                198/833
(Continued)

FOREIGN PATENT DOCUMENTS

DE        2356067 A1    5/1974
EP        0056912 A1    8/1982
(Continued)

OTHER PUBLICATIONS

US 2008/0296130 A1, Langsdorf et al., Dec. 4, 2008.*
(Continued)

*Primary Examiner* — Douglas A Hess
(74) *Attorney, Agent, or Firm* — Holzer Patel Drennan

(57) ABSTRACT

A dual-sloping carousel is disclosed. According to the present invention, the carousel comprises forward-sloping and reverse-sloping sections, so as to reduce the risk of falling baggage, thereby preventing the baggage from being damaged.

12 Claims, 9 Drawing Sheets

(51) Int. Cl.
*B64F 1/36* (2017.01)
*B65G 35/06* (2006.01)
*B65G 17/06* (2006.01)

(58) Field of Classification Search
USPC .................................. 198/469.1, 822, 850
See application file for complete search history.

(56) References Cited

U.S. PATENT DOCUMENTS

| | | | | | |
|---|---|---|---|---|---|
| 3,598,230 | A * | 8/1971 | Riley | ................... | B65G 17/066 |
| | | | | | 198/607 |
| 3,718,249 | A * | 2/1973 | Hess | ................... | B65G 17/066 |
| | | | | | 198/822 |
| 3,777,877 | A * | 12/1973 | Piper | ................... | B65G 17/086 |
| | | | | | 198/833 |
| 3,854,574 | A * | 12/1974 | Theijsmeijer | ........ | B65G 17/066 |
| | | | | | 198/834 |
| 3,881,592 | A * | 5/1975 | Stimpson | ............ | B65G 17/066 |
| | | | | | 198/833 |
| 4,194,616 | A * | 3/1980 | Barthelemy | ......... | B65G 17/086 |
| | | | | | 198/321 |
| 6,334,526 | B1 * | 1/2002 | Hatton | ................. | B65G 17/066 |
| | | | | | 198/469.1 |
| 6,698,577 | B1 * | 3/2004 | Conklin, Jr. | ............ | G09F 19/22 |
| | | | | | 198/502.1 |
| 7,621,392 | B2 * | 11/2009 | Langsdorf | ............ | B65G 17/066 |
| | | | | | 198/502.1 |
| 8,393,462 | B2 * | 3/2013 | Evans | .................. | B65G 17/086 |
| | | | | | 198/831 |
| 9,731,898 | B2 * | 8/2017 | Langsdorf | .............. | B65G 17/24 |
| 2012/0145519 | A1 | 6/2012 | Wilson et al. | | |

FOREIGN PATENT DOCUMENTS

| | | |
|---|---|---|
| KR | 10-1999-0087333 A | 12/1999 |
| KR | 10-2010-036694 A | 4/2010 |
| KR | 10-2011-0003831 U | 4/2011 |
| KR | 10-1206444 B1 | 11/2012 |
| KR | 10-1358267 B1 | 2/2014 |

OTHER PUBLICATIONS

International Search Report and Written Opinion, dated Feb. 5, 2016, Korean Intellectual Property Office.
Office Action issued by the European Patent Office dated Nov. 12, 2018 for European Patent Application 15890851.7.

* cited by examiner

DUAL-SLOPING CAROUSEL

TECHNICAL FIELD

The present invention relates to a dual-sloping carousel, and more particularly, to a dual-sloping carousel in which baggage is loaded on at least one level for preventing baggage from falling and being damaged due to a collision between baggage to be delivered onto a carousel and baggage transferring on the carousel in a baggage handling facility in which a conveyor belt and a carousel are connected to transfer baggage.

BACKGROUND

An airport generally includes a conveyor system (facility) for transporting baggage. A rotational conveyor in a form of a closed loop disposed at a last point of operation of the conveyor system to classify the baggage for each destination and allow the baggage to rotate in a predetermined space in order to be received by a carousel.

However, the carousel may have a problem that baggage is damaged as a result of falling from a connecting portion of a conveyor on to the carousel and a problem that a small amount of baggage is transferred.

In addition, a slope carousel is provided in a form in which a conveyor belt is connected to an inside of a carousel, that is, an inscribed form, such that the carousel occupies a large volume of space on the level where the carousel is disposed, and the cost to install the carousel is higher.

Thus, there is a need to develop a carousel that uses less space due to an installation of a conveyor and costs less to install, but transfers a greater amount of baggage than a slope carousel and prevents baggage from falling and being damaged.

DISCLOSURE OF INVENTION

Technical Goals

An aspect of the present invention provides a dual-sloping carousel that uses less space due to an installation of a conveyor such as a carousel, costs less to install, and includes a downward section and an upward section to increase an amount of baggage and prevent baggage from falling and being damaged.

Technical Solutions

A dual-sloping carousel is described. According to an aspect of the present invention, there is provided a dual-sloping carousel including a conveyor belt outside the dual-sloping carousel, the dual-sloping carousel including a plurality of slats consecutively disposed to allow a transferring surface of the carousel to form a closed loop, a connecting portion configured to allow the slats to slope downward from an outer side to an inner side of the dual-sloping carousel, the connecting portion provided on a portion on which baggage is transferred from the conveyor belt, and a pickup portion configured to allow the slats to slope downward from the inner side to the outer side of the dual-sloping carousel, the pickup portion to be spaced apart from the connecting portion by a predetermined distance, wherein a slope direction of the connecting portion is opposite to a slope direction of the pickup portion.

The connecting portion may slope downward from an outer side to an inner side of the dual-sloping carousel and slope at an angle of approximately 20 degrees with a floor.

A height of one side of a slat close to the conveyor belt may correspond to a height of the conveyor belt, and another side of the slat slope downward.

The dual-sloping carousel may further include a connecting device disposed below each of the slats to adjust heights of the inner side and the outer side of the slats, and each of the slats may include rollers configured to rotate simultaneously with the slats and disposed below each of the slats, a chain configured to allow each of the slats to rotate and disposed between the rollers, and a rail configured to guide the rollers to rotate along a trajectory of the slats, the rail to be spaced apart from each of the slats.

The connecting device may include a transferer having one side that fastens each of the slats and another side that fastens the chain, and a mover configured to move the transferer, the mover connected to the transferer and provided in a rotatable form, and the connecting device responds to a change in slope angles of the slats.

According to another aspect of the present invention, there is provided a dual-sloping carousel including a conveyor belt outside the dual-sloping carousel, the dual-sloping carousel including a connecting portion configured to allow slats of a portion on which baggage is transferred from the conveyor belt to slope downward from an outer side to an inner side of the dual-sloping carousel, and a pickup portion configured to allow the slats to slope downward from the inner side to the outer side of the dual-sloping carousel, the pickup portion to be spaced apart from both sides of the connecting portion, wherein a slope direction of the slats of the connecting portion differs from a slope direction of the slats of the pickup portion.

The connecting portion may slope downward from an outer side to an inner side of the dual-sloping carousel and slope at an angle of approximately 20 degrees with a floor.

Slope angles of a front section and a back section of the connecting portion may be less than a slope angle of the connecting portion, and the pickup portion may slope downward from an inner side to an outer side of the dual-sloping carousel and slope at an angle of approximately 20 degrees with a floor.

Effects

According to example embodiments of the present disclosure, a carousel may include a downward section and an upward section to prevent baggage from falling and being damaged.

According to example embodiments of the present disclosure, a great amount of baggage may be loaded on a carousel.

In addition, it is convenient for passengers to receive baggage because the baggage naturally descends to an outer side where the passengers are waiting based on a slope angle of a carousel.

BEST MODE FOR CARRYING OUT THE INVENTION

Figure 1:
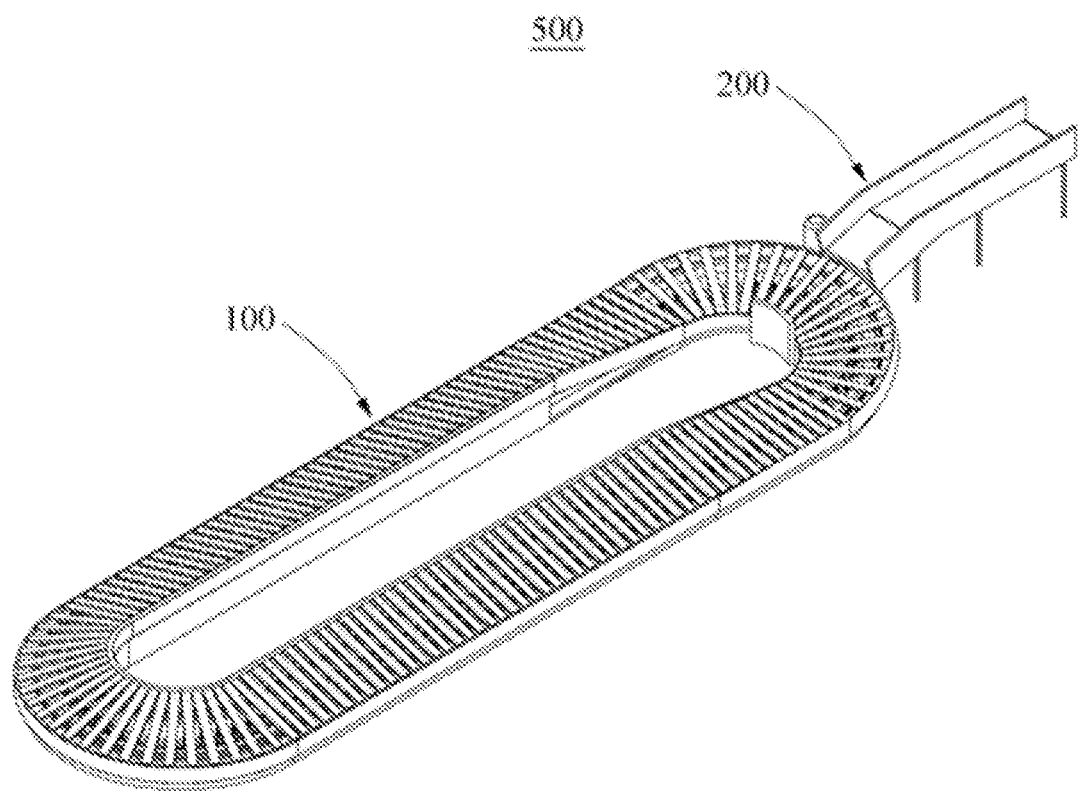
FIG. 1 is a perspective view of a dual-sloping carousel according to an embodiment.
Figure 2:
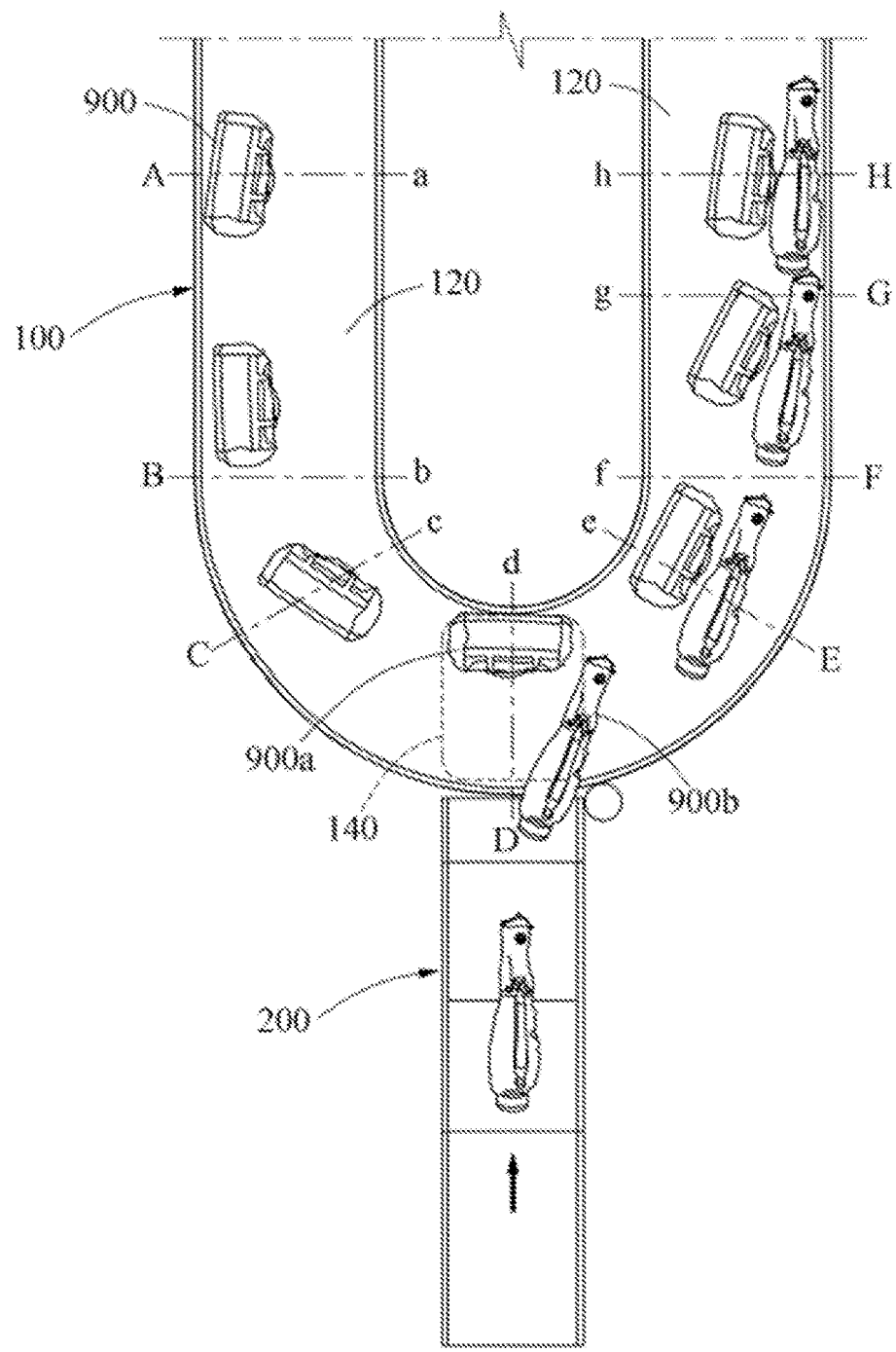
FIG. 2 is a top view of a dual-sloping carousel according to an embodiment.
Figure 3:
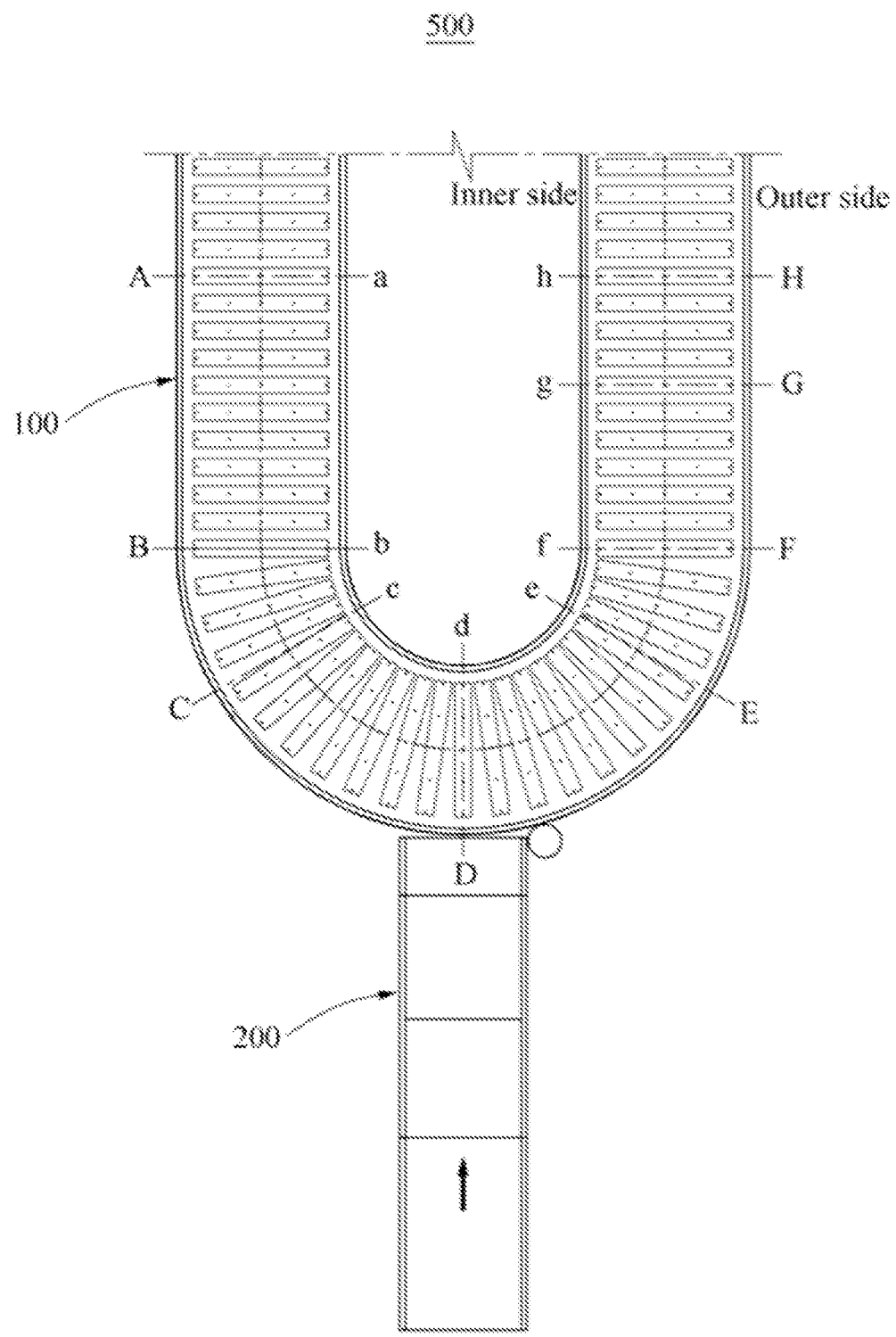
FIG. 3 illustrates a slope gradient in an inward direction and an outward direction (lateral direction) of a transferring surface of a carousel according to an embodiment.
Figure 4:
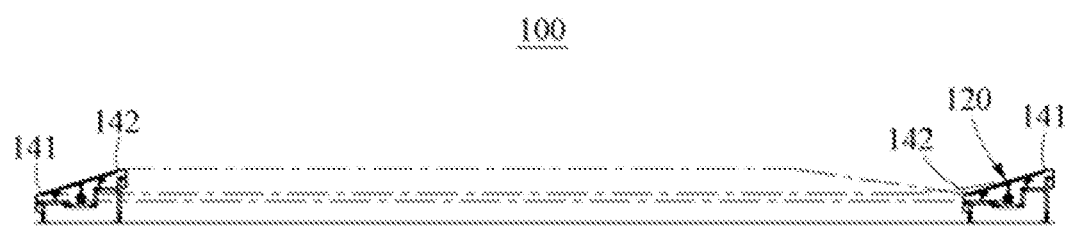
FIG. 4 is a cross-sectional view of a sloped transferring surface according to an embodiment.
Figure 5:
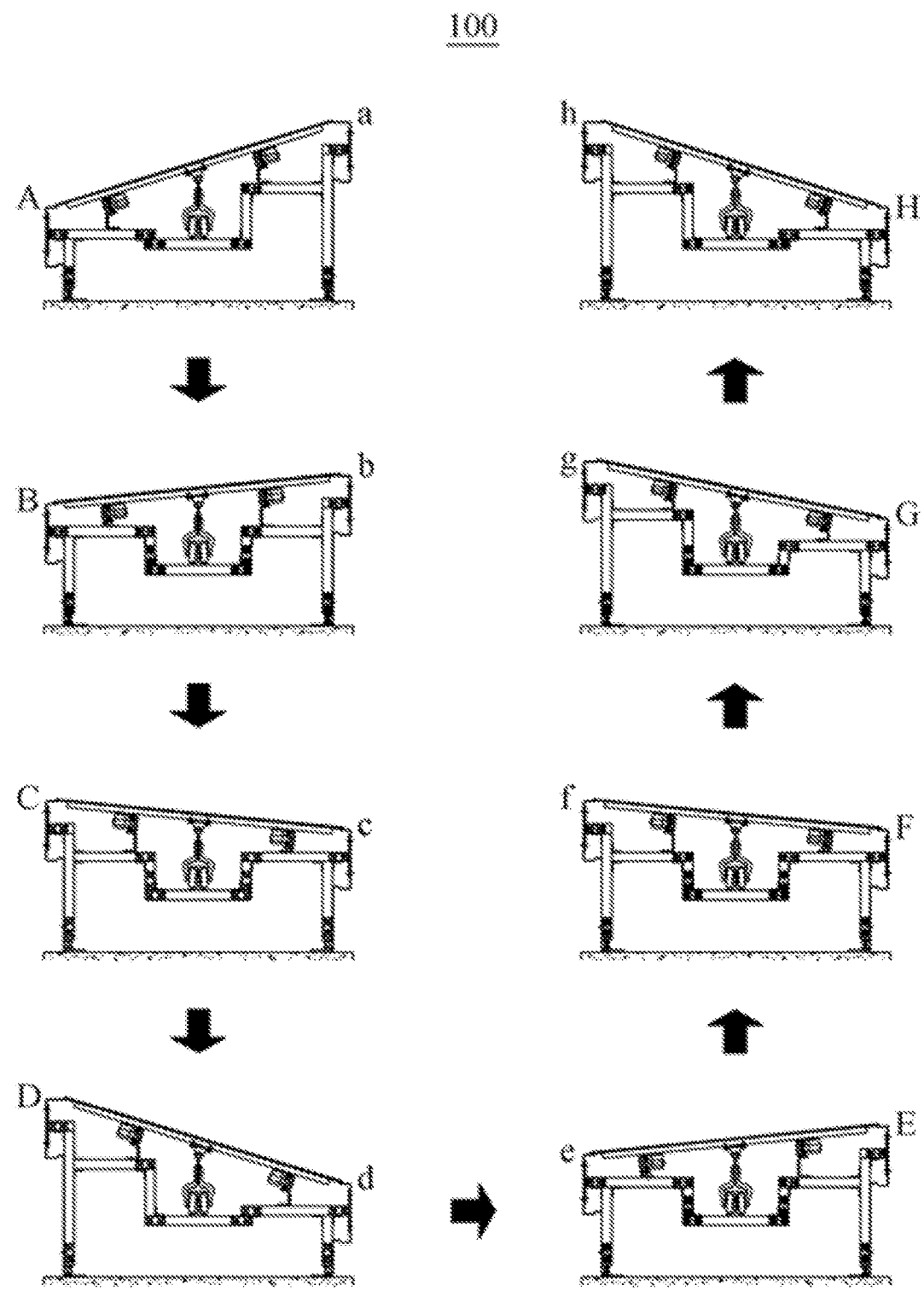
FIG. 5 illustrates a slope in an inward direction and an outward direction of the transferring surface of FIG. 3.
Figure 6:
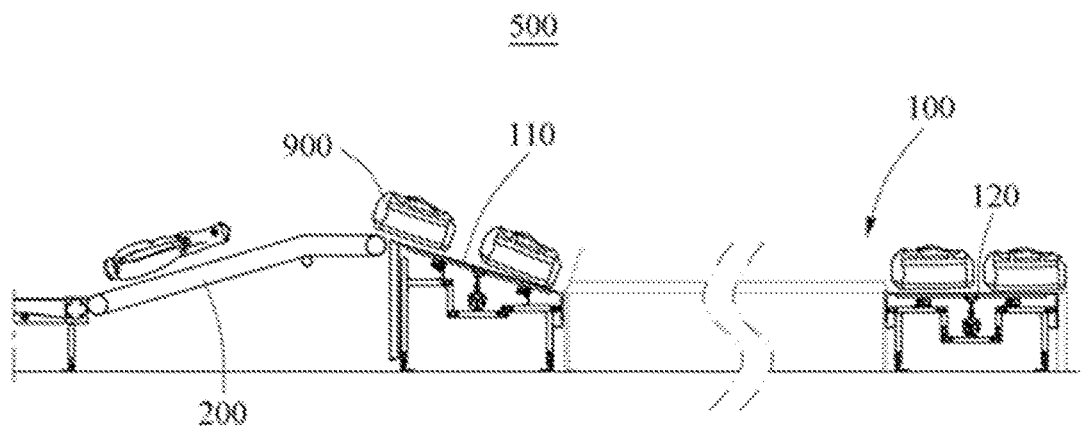
FIG. 6 illustrates a slope of a carousel close to a conveyor according to an embodiment.

FIG. 1 is a perspective view of a dual-sloping carousel according to an embodiment, FIG. 2 is a top view of a dual-sloping carousel according to an embodiment, FIG. 3 illustrates a slope in an inward direction and an outward direction (lateral direction) of a transferring surface of a carousel according to an embodiment, FIG. 4 is a cross-sectional view of a sloped transferring surface according to an embodiment, FIG. 5 illustrates a slope in an inward direction and an outward direction of the transferring surface of FIG. 3, and FIG. 6 illustrates a slope of a carousel close to a conveyor according to an embodiment.

A dual-sloping carousel is not only applied to a baggage transferring and receiving system. The dual-sloping carousel is also applicable to a system for transferring and receiving various objects, for example, cargo, in addition to baggage.

That is, the baggage in the present disclosure may indicate not only baggage in a lexical meaning but also indicate various objects, for example, cargo, that require a transferring and receiving process.

A carousel 100 may include a plurality of slats, for example, a slat 110, consecutively disposed to allow a transferring surface 120 to form a closed loop.

The transferring surface 120 in a form of closed loop may allow a connecting portion 140 that receives baggage 900 from a connection conveyor 200 to have a maximum downward slope to an inner side.

A preventer for preventing the baggage 900 from falling may be provided inside the transferring surface 150 having the maximum downward slope toward an inner side of the transferring surface 120.

Here, the connecting portion 140 may be a portion of the transferring surface 120 in the form of closed loop that receives the baggage 900 from the conveyor belt 60. A portion of the connecting portion 140 on which the connection conveyor 200 is disposed may slope downward from the outer side to the inner side of the carousel at an angle of approximately 20 degrees with a floor. Slope angles of a front section and a back section of the connecting portion may decrease and then a slope angle of the connecting portion 140 may be maximized.

A section other than the connecting portion may slope downward from the inner side to the outer side of the carousel.

The connecting portion 140 close to a conveyor belt may form a downward slope from the outer side to the inner side at an angle of approximately 20 degrees with a horizontal surface.

In an example, the connecting portion 140 of the carousel close to the conveyor belt includes a first connecting portion 141 provided in a form in which a height of a transferring surface corresponds to a height of the conveyor belt, and the transferring surface of a second connecting portion 142 slopes downward from the outer side to the inner side of the carousel. When a slat passes through the connecting portion 140, slope angles of a first connecting portion and a second connecting portion may decrease and then the slope angle of the second connecting portion is greater than that of the first connecting portion, such that the outer side of the carousel has a downward slope. When the slat is close to the connecting portion 140, the transferring surface is disposed such that the height of the first connecting portion 141 corresponds to the height of the conveyor belt, and the transferring surface of the second connecting portion 142 may slope downward from the outer side to the inner side of the carousel.

A slope direction of slats of the connecting portion 140 may differ from a slope direction of slats of a pickup portion section.

Hereinafter, description is provided with reference to FIG. 5. A section starting from a line H-h may be a pickup section, and a section of a line D-d may be a connecting portion of the carousel close to the conveyor belt.

When slats move, the slats may rotate and slope downward from the outer side to the inner side of the carousel in response to the slats being close to the connecting portion. Thus, in response to the slats being close to the connecting portion, the slats may form a maximum slope angle of approximately 20 degrees from the outer side to the inner side of the carousel. When the slats pass through the connecting portion, the slope angles of the slats may decrease and then the slats may slope downward from the inner side to the outer side of the carousel.

A section of a line A-a may slope at an angle of approximately 17 degrees from the inner side to the outer side. When the slats rotate more, the slats may slope at an angle of approximately 5 degrees from the inner side to the outer side in response to the slats being close to a section of a line B-b. Subsequently, angles of the slats are changed in a section of a line C-c close to the connecting portion such that the slats may slope at an angle of approximately 5 degrees from the outer side to the inner side of the carousel, and the slats may slope at a maximum angle of approximately 20 degrees from the outer side to the inner side of the carousel in a neighborhood of the connecting portion of a section of a line D-d. When the slats move toward a section of a line E-e by passing through the connecting portion, the slats may slope at an angle of approximately 5 degrees from the outer side to the inner side of the carousel.

Subsequently, to allow a customer to pick up the baggage conveniently, the slope direction of the slats may be in reverse such that the slats of a section of a line F-f may slope downward at an angle of 5 degrees from the inner side to the outer side of the carousel, the slats of a section of a line G-g may slope downward at an angle of 12 degrees from the inner side to the outer side of the carousel, and the slats of a section of a line H-h may slope downward at an angle of 17 degrees from the inner side to the outer side of the carousel.

A 17-degree angle at which outer portions of the slats slope downward from the outer side to the inner side of the carousel may be less than an angle of inner portions of the slats such that baggage may be double loaded and it is convenient to pick up the baggage which is far away from a passenger. Also, upper baggage may naturally descend in response to the lower baggage being received.

In addition, a height of an outermost side D of the connecting portion 140 corresponding to the connection conveyor 200 is set to be greatest among outermost sides A, B, C, D, E, and F of the transferring surface 120. Thus, both sides of the outermost side D may gradually slope, and the outermost sides C and E may have intermediate heights.

Thus, due to a sloping structure of the outer side and the inner side of the carousel through ascending and descending of the outer side of the transferring surface 120 from the side A to the side H, first baggage 900a which is firstly loaded to revolve may pass through the lines A-a and B-b such that the transferring surface 120 starts to move along an outer downward slope, and the first baggage 900a may be completely moved to the inner side of the transferring surface 120 in the connecting portion 140 to which second baggage 900b is to be transferred, that is, a section of line D-d, and thus, it is possible to avoid a collision with the second baggage 900b. Based on such sloping structure, the baggage 900 may be prevented from a damage due to a collision or a departure (fall) to the floor.

The section starting from the line H-h to the line A-a may correspond to the pickup portion, and the section starting from the line A-a to the line C-c may correspond to a first section of the connecting portion, the section of the line D-d may correspond to the connecting portion, the sections of the lines E-e, F-f, and G-g may correspond to a last section of the connecting portion, and a section after the line H-h may correspond to the pickup portion.

A height of an outermost side of the transferring surface 120 may have a maximum height in the connecting portion 140, and then decrease as the transferring surface 120 is distanced from the connecting portion 140, and a slope angle may be greatest in response to the transferring surface 120 being close to the connecting portion again. The slope in the inward direction and the outward direction of the transferring surface 120 may be adjusted along a path of a closed loop, and the consecutive slats, for example, the slat 110, may be extended along the path of the closed loop.

Due to the carousel 100 connected to a level identical to that of the conveyor belt 200, the baggage may be prevented from falling or departure and the slats may slope and thus, the baggage may be double loaded.

The slope angle of the slat 110 may vary depending on materials because a friction value differs from the material of the slat 110.

Although the numerical angle is described, this is not limited thereto. A structure of sloping downward from the outer side to the inner side of the carousel in a neighborhood of the connecting portion 140 and a structure of sloping downward from the outer side to the inner side of the carousel in a neighborhood of the pickup portion are all possible.

The neighboring portion of the pickup portion of the connecting portion 140 and the sections starting from the line H-h to the line A-a may slope at an angle of approximately 20 degrees with the floor, and the slope direction of the connecting portion 140 may be opposite to the slope direction of the pickup portion.

Thus, the baggage may naturally descend to an outer side where passengers are waiting based on a slope angle of the carousel such that the passenger may easily receive the baggage.

Figure 7:
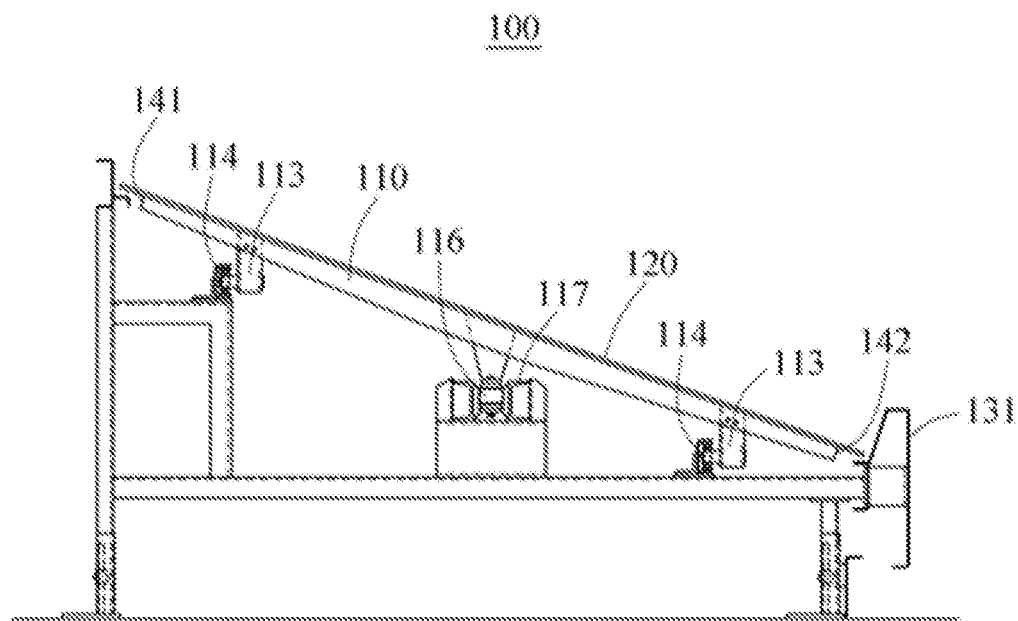
FIG. 7 illustrates a configuration of a slat.

FIG. 7 illustrates a configuration of a slat. Description is provided below.

The carousel 100 includes a plurality of slats, for example, the slat 110, and the transferring surface 120 for transferring baggage is provided on the slat 110. A chain 116 for transferring a slat may be disposed under the slat 110, and each of side rollers 113 may be disposed on both sides of a chain.

The chain 116 and the side rollers 113 may be connected to a bottom surface of the slat 110, and side rails 114 corresponding to the side rollers 113 and a guide rail 117 corresponding to a chain may be provided for each frame 131.

The frame 131 including the rails 114 and the guide rail 117 may be provided in a fastened type, and the rollers 113 and the chain 116 corresponding to a rail may move the slat 110 to allow the transferring surface 110 to revolve.

The chain 116 and the rollers 113 may be connected to each of slats, and the slats may form a form of a closed loop to provide the carousel by consecutively move the slats.

As illustrated in FIGS. 1 through 6, a frame may have a level difference under the slat on each sloping portion of the carousel.

The side rollers 113 may correspond to the side rails 114. The side rollers 113 may roll along a trajectory of the chain 160 and the side rails 114 to move the slat 110 such that a moving path in a form of closed loop may be formed.

Figure 8A:
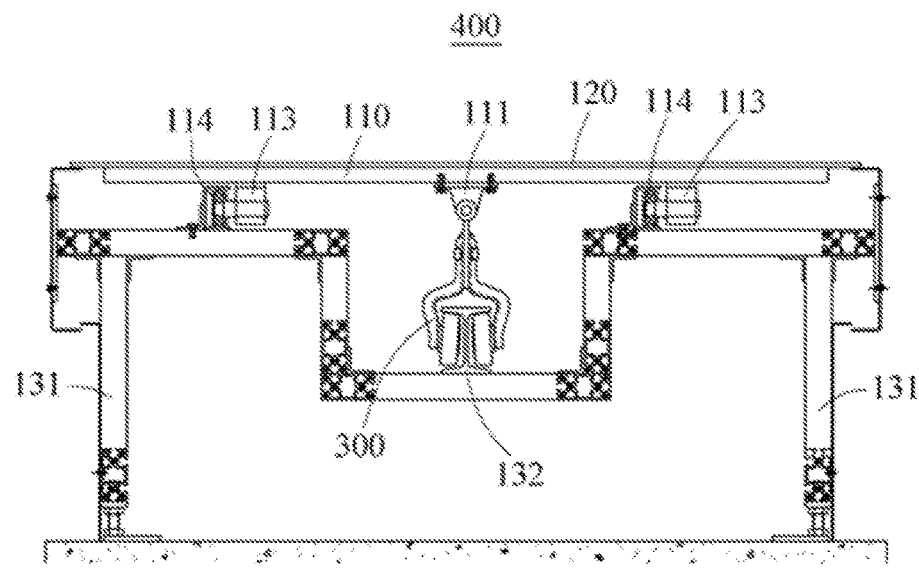
FIG. 8a illustrates that a connecting device allows a slat to be in a horizontal form and FIG. 8b illustrates that a connecting device allows a slat to be in a sloped form.
Figure 8B:
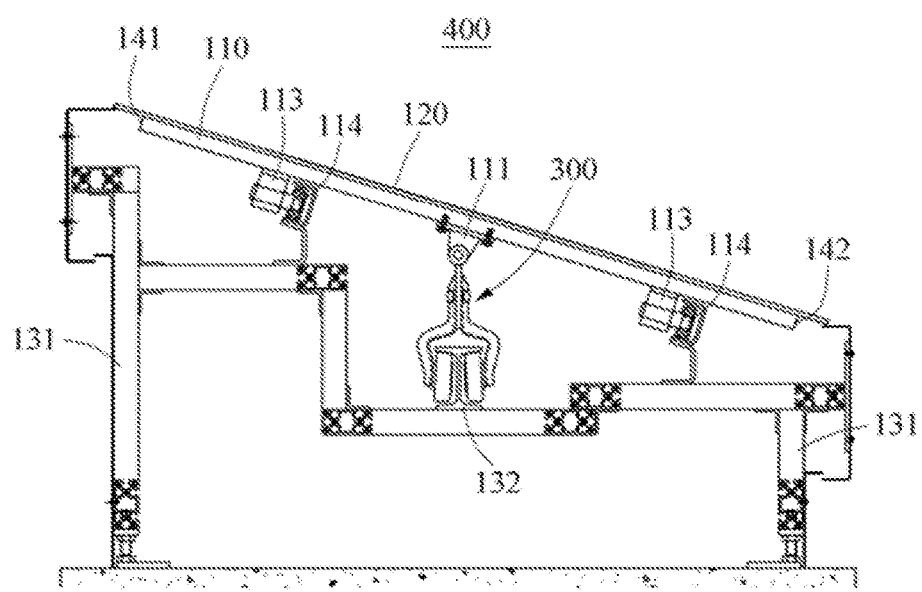
Figure 9A:
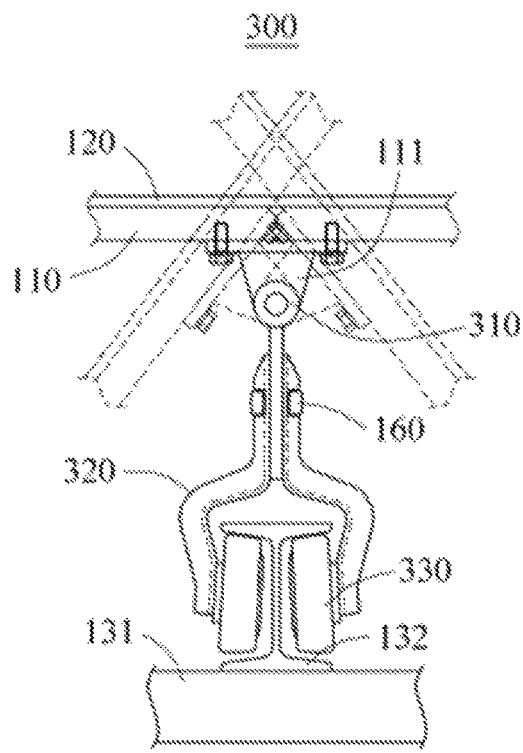
FIG. 9a is a front view of a connecting device to which a slat is flexibly fastened and FIG. 9b is a side view of a connecting device to which a slat is flexibly fastened.
Figure 9B:
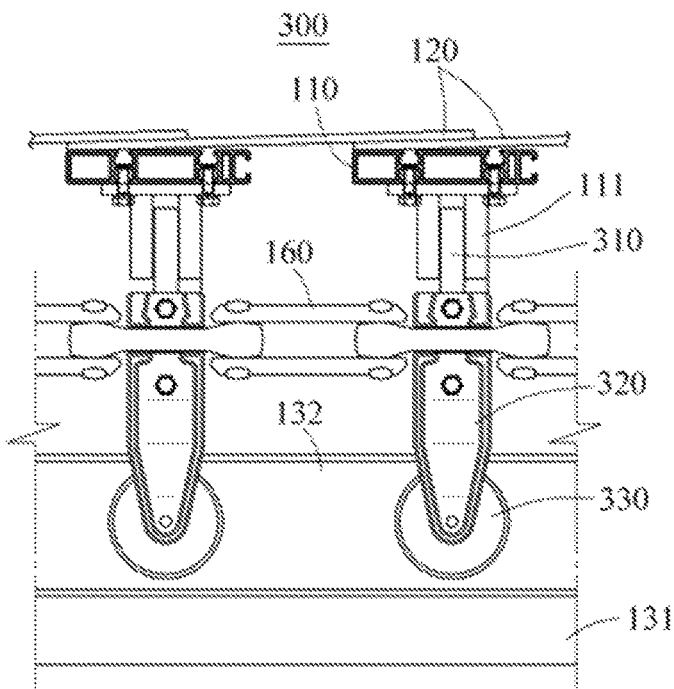

FIG. 8a illustrates that a connecting device allows a slat to be in a horizontal form and FIG. 8b illustrates that a connecting device allows a slat to be in a sloped form, and FIG. 9a is a front view of a connecting device to which a slat is flexibly fastened and FIG. 9b is a side view of a connecting device to which a slat is flexibly fastened.

A connecting device 300 may be provided under the slat 110. One side of a connecting device is fastened to a bottom end of the slat, and another side is connected to a frame. The connecting device may flexibly fasten the chain 160 to rotate the slat flexibly.

To rotate the slat 110, a chain may be provided under the slat 110. The chain 160 may rotate in response to a rotation of a sprocket and a reduced motor, and a plurality of slats rotate by moving the connecting device 300 connected to the chain such that a transferring surface may revolve flexibly.

The connecting device 300 includes a rotator 310, a transferer 320, and a moving portion 330. The rotator 310 may be connected to a slat fastener 111 disposed under a slat, in a hinge type. The transferer 320 may be connected to a bottom portion of the rotator 310 provided in the hinge type, and a wheel, that is, the moving portion 330, in a roller type may be provided under the transferer. A moving apparatus may include the transferer 320 connected to the bottom portion of the rotator 310 and the moving portion 330 connected to a bottom portion of the transferer.

The transferer 320 may be connected to the chain 160 that fastens a slat, and the chain 160 may be connected between the moving portion 330 and the rotator 310. When the slat rotates by the chain 160, the chain may transmit a power to the transferer, and the moving portion 330 including at least one of a roller, a wheel, or a bearing disposed under the transferer may be rotatable. Thus, a moving path in a form of closed loop may be formed by moving the slat in response to the moving portion rotating along a trajectory of a carousel. A guide portion 132 may be fastened to a center of an upper surface of a frame, and the guide portion 132 may guide the moving portion 330.

The chain 116 for transferring the slat may be disposed under the slat 110, and the side rollers 113 may be provided on both sides of the chain such that the side rollers 113 may be connected to the slat 110.

The chain 116 and the side rollers 113 may be provided under the slat, and the side rails 114 corresponding to the side rollers and the guide portion 132 corresponding to the connecting device may be provided for the frame 131.

The frame 131 may be fastened to a floor, and the connecting device may fasten the slat in the hinge type by moving the connecting device on the frame to flexibly support the slat 110. The guide portion 132 may be disposed on the frame 131.

The moving portion 330 may move along the guide portion 132, and a moving direction of the moving portion 330 may differ from a moving direction of the rotator. For example, when the moving portion moves vertically, the rotator 310 may move horizontally. The moving portion 330 and the rotator 310 may move and rotate in different directions or an identical direction.

Because the chain 160 is connected to the moving portion 330 and the rotator 310, the moving portion 330 and the rotator 310 may flexibly support the slat 110. The connecting device 300 connected to the chain 160 may form different heights of an inner side and an outer side of a transferring surface 151 provided on the slat 110.

The connecting portion 140 may slope downward from an outer side to an inner side of the carousel, and other portions may slope downward from the inner side to the outer side of the carousel. Thus, baggage may be safely transferred to a customer and the baggage may be double loaded using a slope angle.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A dual-sloping carousel including a conveyor belt outside the dual-sloping carousel, the dual-sloping carousel comprising:
   a plurality of slats consecutively disposed to allow a transferring surface of the carousel to form a closed loop;
   a connecting portion configured to allow the slats to slope downward from an outer side to an inner side of the dual-sloping carousel, the connecting portion provided on a portion on which baggage is transferred from the conveyor belt;
   a pickup portion configured to allow the slats to slope downward from the inner side to the outer side of the dual-sloping carousel, the pickup portion to be spaced apart from the connecting portion by a predetermined distance;
   rollers configured to rotate simultaneously with the slats and disposed below each of the slats;
   a chain configured to allow each of the slats to rotate and disposed between the rollers; and
   a rail configured to guide the rollers to rotate along a trajectory of the slats, the rail to be spaced apart from each of the slats, wherein a slope direction of the connecting portion is opposite to a slope direction of the pickup portion.

2. The dual-sloping carousel of claim 1, wherein slope angles of a front section and a back section of the connecting portion are less than a slope angle of the connecting portion.

3. The dual-sloping carousel of claim 1, wherein the connecting portion slopes downward from an outer side to an inner side of the dual-sloping carousel and slopes at an angle of approximately 20 degrees with reference to a floor.

4. The dual-sloping carousel of claim 1, wherein the pickup portion slopes downward from an inner side to an outer side of the dual-sloping carousel and slopes at an angle of approximately 20 degrees with reference to a floor.

5. The dual-sloping carousel of claim 1, wherein a height of one side of a slat close to the conveyor belt corresponds to a height of the conveyor belt, and another side of the slat slopes downward.

6. The dual-sloping carousel of claim 1, further comprising:
   a connecting device disposed below each of the slats to adjust heights of the inner side and the outer side of the slats.

7. The dual-sloping carousel of claim 6, wherein the connecting device comprises:
   a transferer having one side that fastens to each of the slats and another side that fastens to the chain; and
   a mover configured to move the transferer, the mover connected to the transferer and provided in a rotatable form.

8. The dual-sloping carousel of claim 6, wherein the connecting device responds to a change in slope angle of the slats.

9. A dual-sloping carousel including a conveyor belt outside the dual-sloping carousel, the dual-sloping carousel comprising:
   a connecting portion configured to allow slats of a portion on which baggage is transferred from the conveyor belt to slope downward from an outer side to an inner side of the dual-sloping carousel;
   a pickup portion configured to allow the slats to slope downward from the inner side to the outer side of the dual-sloping carousel, the pickup portion to be spaced apart from both sides of the connecting portion;
   rollers configured to rotate simultaneously with the slats and disposed below each of the slats;
   a chain configured to allow each of the slats to rotate and disposed between the rollers; and
   a rail configured to guide the rollers to rotate along a trajectory of the slats, the rail to be spaced apart from each of the slats, wherein a slope direction of the slats of the connecting portion differs from a slope direction of the slats of the pickup portion.

10. The dual-sloping carousel of claim 9, wherein slope angles of a front section and a back section of the connecting portion are less than a slope angle of the connecting portion.

11. The dual-sloping carousel of claim 9, wherein the connecting portion slopes downward from an outer side to an inner side of the dual-sloping carousel and slopes at an angle of approximately 20 degrees with reference to a floor.

12. The dual-sloping carousel of claim 9, wherein the pickup portion slopes downward from an inner side to an outer side of the dual-sloping carousel and slopes at an angle of approximately 20 degrees with reference to a floor.

* * * * *